(12) United States Patent
Xiao et al.

(10) Patent No.: US 12,281,918 B2
(45) Date of Patent: Apr. 22, 2025

(54) CONTROL METHOD AND EQUIPMENT FOR LIVESTOCK AND POULTRY HEALTH INSPECTION ROBOT FOR MULTI-INDEX COLLECTION

(71) Applicant: SOUTH CHINA AGRICULTURAL UNIVERSITY, Guangzhou (CN)

(72) Inventors: Deqin Xiao, Guangzhou (CN); Gengqian Wu, Guangzhou (CN); Yigui Huang, Guangzhou (CN); Jianzhao Feng, Guangzhou (CN); Zujie Tan, Guangzhou (CN); Bin Zhang, Guangzhou (CN); Handong Wang, Guangzhou (CN); Qiumei Yang, Guangzhou (CN)

(73) Assignee: SOUTH CHINA AGRICULTURAL UNIVERSITY, Guangzhou (CN)

( * ) Notice: Subject to any disclaimer, the term of this patent is extended or adjusted under 35 U.S.C. 154(b) by 0 days.

(21) Appl. No.: 18/751,244

(22) Filed: Jun. 22, 2024

(65) Prior Publication Data
US 2024/0341283 A1    Oct. 17, 2024

Related U.S. Application Data

(63) Continuation of application No. PCT/CN2023/132828, filed on Nov. 21, 2023.

(30) Foreign Application Priority Data

Jan. 10, 2023    (CN) .......................... 202310030905.2

(51) Int. Cl.
*B25J 9/16*    (2006.01)
*A01K 45/00*    (2006.01)
(Continued)

(52) U.S. Cl.
CPC ............. *G01D 21/02* (2013.01); *A01K 45/00* (2013.01); *B25J 9/1615* (2013.01); *B25J 9/1664* (2013.01); *B25J 9/1697* (2013.01); *B25J 19/022* (2013.01)

(58) Field of Classification Search
CPC ....... G01D 21/02; A01K 45/00; B25J 9/1615; B25J 9/1664; B25J 9/1697; B25J 19/022; (Continued)

(56) References Cited

U.S. PATENT DOCUMENTS

2020/0225673 A1*   7/2020   Ebrahimi Afrouzi ....................... A47L 11/4011

FOREIGN PATENT DOCUMENTS

CN    108189043 A    6/2018
CN    112212917 B    1/2021
(Continued)

*Primary Examiner* — Spencer D Patton
(74) *Attorney, Agent, or Firm* — Birchwood IP

(57) ABSTRACT

The present invention discloses a control method and equipment for a livestock and poultry health inspection robot for multi-index collection. The method comprises the following steps: S1: performing initial detection on the robot; S2: according to a set inspection time and a target inspection point, generating a target position instruction and sending the target position instruction to the robot; S3: controlling the robot to reach a target inspection point according to the target position instruction in the step S2; S4: controlling the robot to collect multi-index data at the target inspection point reached in the step S3; and S5: judging whether the inspection of the set target inspection point is completed; if yes, returning to a charging pile; otherwise, jumping to the step S2. The present invention can control the robot to automatically complete data collection tasks at a fixed time and a fixed point.

7 Claims, 4 Drawing Sheets

(51) Int. Cl.
*B25J 19/02* (2006.01)
*G01D 21/02* (2006.01)

(58) Field of Classification Search
CPC ........ G05D 1/0094; G05D 1/02; G05D 1/021;
G05D 1/0212; G05D 1/0225; G05D
1/0231; G05D 1/0236; G05D 1/0233;
G05D 1/024; G05D 1/0248; G05D 1/12;
G05D 1/229; G05D 1/24; G05D 1/242;
G05D 1/43; G05D 1/6445; G05D 1/648;
G05D 1/661; G05D 1/689
See application file for complete search history.

(56) References Cited

FOREIGN PATENT DOCUMENTS

| | | |
|---|---|---|
| CN | 113223035 A | 8/2021 |
| CN | 114043493 A | 2/2022 |
| CN | 115771153 B | 3/2023 |
| WO | 2022207766 A1 | 10/2022 |

\* cited by examiner

CONTROL METHOD AND EQUIPMENT FOR LIVESTOCK AND POULTRY HEALTH INSPECTION ROBOT FOR MULTI-INDEX COLLECTION

CROSS-REFERENCE TO RELATED APPLICATIONS

This application is a continuation of co-pending International Patent Application No. PCT/CN2023/132828, filed on Nov. 21, 2023, which claims the priority and benefit of Chinese patent application number 202310030905.2, filed on Jan. 10, 2023 with China National Intellectual Property Administration, the entire contents of which are incorporated herein by reference.

TECHNICAL FIELD

The present invention relates to the field of inspection robot control, and specifically to a control method and equipment for a livestock and poultry health inspection robot for multi-index collection.

BACKGROUND

With the continuous development of the livestock and poultry farming industry, structured and factory-based farming has started to emerge, the scale of pig farming in buildings in the pig farming industry has continued to expand, and poultry farms have also begun to focus on more structured family fence farming. The most significant benefit of structured and factory-based farming are land area savings and transportation cost reduction. However, there are a series of problems in factory-based farming. For example, due to the increasing density of livestock and poultry farming, large-area infection is more easily caused when epidemic diseases invade, and it is impossible to achieve 24-hour manual inspection. A livestock and poultry health inspection robot can collect various physiological and environmental indexes of livestock and poultry growth more safely and comprehensively, and provides a large amount of data support for livestock and poultry health monitoring, so that structured and factory-based farming requires the livestock and poultry health inspection robot to complete livestock and poultry health monitoring inspection tasks. The livestock and poultry health inspection robot can be used to provide support for factory-based livestock and poultry farming health monitoring, which has important significance.

In traditional livestock and poultry farming, livestock and poultry health data are manually measured and recorded. Since the number of livestock and poultry farming is continuously increasing, the manual measurement and recording is time-consuming and labor-consuming, and easily leads to recording errors and omissions. An information collection assembly is equipped in the prior art, which only collects image information of a farming object and lacks a sensing device for monitoring environmental data; consequently, calibration data cannot be automatically provided for the sensing device for monitoring the physiological indexes of the livestock and poultry, and the growth environmental conditions of the livestock and the poultry cannot be monitored. The sensing device equipped in the prior art cannot reach a set position at a fixed time and a fixed point automatically, and cannot automatically obtain the physiological data and environmental data of livestock and poultry at the required position, which is not beneficial to long-term monitoring of the health status of livestock and poultry in farms. In the prior art, the robot is accurately positioned at a preset monitoring position by using electronic tags, a large number of electronic tags need to read and write preset position information, and the arrangement of the electronic tags needs a large amount of labor costs. In actual farm scenarios, it is necessary not only to collect various physiological and environmental data that reflect the health status of livestock and poultry, but also to be able to automatically reach a set position in a set time period, so that the efficiency is improved, and the energy consumption is saved.

SUMMARY

Aiming at the defects in the prior art, the control method and equipment for a livestock and poultry health inspection robot for multi-index collection provided by the present invention can control the robot to automatically complete multi-index data collection tasks at a fixed time and a fixed point.

In order to achieve the above objective, the present invention uses the following technical solutions.

A control method for a livestock and poultry health inspection robot for multi-index collection comprises the following steps:
S1: performing initial detection on the robot;
S2: according to a set inspection time and a target inspection point, generating a target position instruction and sending the target position instruction to the robot;
S3: controlling the robot to reach a target inspection point according to the target position instruction in the step S2;
S4: controlling the robot to collect multi-index data at the target inspection point reached in the step S3; and
S5: judging whether the inspection of the set target inspection point is completed; if yes, returning to a charging pile; otherwise, jumping to the step S2.

Further, the step S1 comprises the following substeps:
S11: judging whether a battery level of the robot is sufficient; if yes, proceeding to the step S2; otherwise, sending a charging command to the robot and proceeding to substep S12; and
S12: judging whether laser data of the robot is abnormal; and if yes, performing alarming; otherwise, controlling the robot to return to a charging pile according to the charging instruction in the substep S11.

Further, in the substep S12, the judging whether laser data of the robot is abnormal comprises the following steps:
S121: judging whether an amplitude of two consecutive frames of laser data is greater than a set laser data amplitude threshold; if yes, judging that the data are abnormal; otherwise, proceeding to substep S122;
S122: judging whether the current frame of laser data are in a range between a set minimum laser data threshold and a set maximum laser data threshold; if yes, proceeding to substep S123; otherwise, judging that the data are abnormal; and
S123: judging whether a difference between the current frame of laser data and an optimal estimated position value of a previous positioning period is greater than a set actual measurement error threshold; if yes, judging that the data are abnormal; otherwise, judging that the data are not abnormal.

Further, the step S3 comprises the following substeps:

S31: according to the optimal estimated position of the robot in the previous positioning period, the reading of an encoder and the reading of a laser ranging sensor, determining an optimal estimated position of the robot in a current positioning period;

S32: judging whether a difference between the optimal estimated position of the robot in the current positioning period in the substep S31 and a target position is less than a set target error threshold; if yes, reaching the target inspection point; otherwise, proceeding to substep S33;

S33: judging whether the laser data of the robot is abnormal; if yes, performing alarming; otherwise, proceeding to substep S34;

S34: according to the target position and the optimal estimated position of the previous positioning period, determining a current value of a motor controlled in the current speed control period; and S35: controlling the robot to move according to the current value of the motor in the current speed control period in the substep S34, updating the reading of the encoder and the reading of the laser ranging sensor, and jumping to the substep S31.

Further, the S31 comprises the following substeps:

S311: determining an accumulated distance of a motor encoder in the current positioning period according to the reading of the encoder;

S312: calculating a priori estimated position of the current positioning period according to the accumulated distance of the motor encoder in the current positioning period in the substep S311, wherein the calculation formula is as follows:

$$x_k^- = x_{k-1} + u_{k-1}$$

wherein $x_k^-$ is the priori estimated position of the current positioning period, $x_{k-1}$ is the optimal estimated position of the previous positioning period, and $u_{k-1}$ is the accumulated distance of the motor encoder in the current positioning period;

S313: calculating a priori estimated variance of the current positioning period according to a posteriori estimated variance and a process noise variance of the previous positioning period, wherein the calculation formula is as follows:

$$P_k^- = P_{k-1} + Q$$

wherein $P_k^-$ is the priori estimated variance of the current positioning period, $P_{k-1}$ is the posteriori estimated variance of the previous positioning period, $P_{k-1}=(1-K_{k-1})P_{k-1}^-$ and $K_{k-1}$ are Kalman gain of the previous positioning period, $P_{k-1}^-$ is the priori estimated variance of the previous positioning period, and Q is the process noise variance;

S314: calculating a measurement noise variance according to an adaptive measurement noise variance function, wherein an analytic formula of the adaptive measurement noise variance function is as follows:

$$R = \frac{1}{\omega} \cdot \frac{Z_k}{\sqrt{1+Z_k^2}}$$

wherein R is the measurement noise variance, ω is an adaptive measurement noise variance coefficient, and ZK is an actual observation position of the current positioning period;

S315: according to the priori estimated variance of the current positioning period in the substep S313 and the measurement noise variance in the substep S314, calculating the Kalman gain of the current positioning period, wherein the calculation formula is as follows:

$$K_k = \frac{P_k^-}{P_k^- + R}$$

wherein $K_k$ is the Kalman gain of the current positioning period; and

S316: according to the priori estimated position of the current positioning period in the substep S312, the Kalman gain of the current positioning period in the substep S315 and the actual observation position of the current positioning period, calculating an optimal estimated position of the current positioning period, wherein the calculation formula is as follows:

$$x_k = x_k^- + K_k(Z_k - x_k^-)$$

wherein $x_k$ is the optimal estimated position of the current positioning period.

Further, the step S34 comprises the following substeps:

S341: according to the target position and the optimal estimated position of the previous positioning period, calculating a target speed of the robot in the current speed control period, wherein the calculation formula is as follows:

$$v_{target} = P_x(x_{target} - x_k)$$

wherein $v_{target}$ is the target speed of the robot in the current speed control period, $P_x$ is a position proportional coefficient, $x_{target}$ is the target position, and $x_{k-1}$ is the optimal estimated position of the previous positioning period; and S342: according to a feedback speed of a previous speed control period and the target speed of the robot in the current speed control period in the substep S341, calculating a current value of the motor controlled in the current speed control period, wherein the calculation formula is as follows:

$$cur_{target} = P_v e_k + I_v \sum_{i=0}^{k} e_i$$

wherein $cur_{target}$ is the current value of the motor controlled in the current speed control period, $P_v$ is a speed proportional coefficient, $e_k = v_{target} - v_{k-1}$ and $v_{k-1}$ are the feedback speed of the previous speed control period, and $I_v$ is an integral coefficient.

Further, the step S4 comprises the following substeps:

S41: obtaining multi-index data including depth video data, color video data, infrared video data, temperature and humidity data, carbon dioxide concentration data and sound data according to time sequence through multiple threads;

S42: selecting the latest starting time of the multi-index data in the substep S41 as timestamp of current position data;

S43: intercepting multi-index data of the current position data after the timestamp in the substep S42; and S44: adding the position information and the timestamp in the substep S42 to the multi-index data in the substep S43, and uploading the multi-index data with the position information and the timestamp.

Control equipment for a livestock and poultry health inspection robot for multi-index collection applied to the method comprises:

a driving wheel motor group, wherein the driving wheel motor group comprises a driving wheel motor and an I-shaped steel track, and the driving wheel motor is configured to receive a target position instruction of an inspection control module and drive the robot to move on the I-shaped steel track to reach a target position;

a laser ranging group, wherein the laser ranging group comprises two laser ranging sensors and two laser reflection baffles, the laser ranging sensors are configured for measurement to obtain observation position information of the robot in the current positioning period and transmitting the observation position information to an inspection control module, and the laser reflection baffles are configured to reflect laser beams emitted by the laser ranging sensors;

a video data collection module, wherein the video data collection module comprises a depth camera, a color camera and an infrared camera, the depth camera is configured to receive a collection instruction of an inspection control module to collect depth video data and transmit the depth video data to the inspection control module, the color camera is configured to receive a collection instruction of an inspection control module to collect color video data and transmit the color video data to the inspection control module, and the infrared camera is configured to receive a collection instruction of an inspection control module to collect infrared video data and transmit the infrared video data to the inspection control module;

an environmental data collection module, wherein the environmental data collection module comprises a temperature and humidity sensor, a carbon dioxide sensor and a sound collector, the temperature and humidity sensor is configured to receive a collection instruction of an inspection control module to collect temperature and humidity data of an environment and transmit the temperature and humidity data to the inspection control module, the carbon dioxide sensor is configured to receive a collection instruction of an inspection control module to collect carbon dioxide concentration data in the environment and transmit the carbon dioxide concentration data to the inspection control module, and the sound collector is configured to receive a collection instruction of an inspection control module to collect sound data in the environment and transmit the sound data to the inspection control module; and an inspection control module, wherein the inspection control module is configured to perform initial detection on the robot, generate a target position instruction according to a set inspection time and a target inspection point, send the target position instruction to the driving wheel motor group to control the robot to reach a target position, receive the observation position information of the robot in the current positioning period transmitted by the laser ranging group, check whether the laser data are abnormal, generate a collection instruction, send the collection instruction to the video collection module, receive video data of multi-index data transmitted by the video data collection module, generate a collection instruction, send the collection instruction to the environment collection module, and receive environmental data of multi-index data transmitted by the environmental data collection module.

The beneficial effects of the present invention are as follows:

(1) the present invention can automatically complete the task of collecting the video and environmental data according to the set time and position, process and store the data by using the video data and environmental data segmentation method designed by the present invention; compared with the conventional data collection method, the present invention can provide comprehensive and accurate data and autonomously operate under an unmanned condition, which breaks through time limitation, improves efficiency, and enables the livestock and poultry health monitoring to be more comprehensive;

(2) the present invention adopts a multi-sensor fusion positioning method based on an adaptive Kalman filtering algorithm, adaptively adjusts Kalman gain by using an adaptive measurement noise variance function designed by the present invention, fuses the position information of the robot in the previous positioning period, the reading of the encoder after applying a control quantity in the current positioning period and the reading of the laser ranging sensor, and calculates to obtain the optimal estimated position of the robot in the current positioning period, thereby ensuring that the robot is positioned more accurately and the collected data are more accurate and usable;

(3) the present invention adopts a speed adaptive control method based on a feedback mechanism, calculates the target speed of the robot in the current speed control period through the error between the optimal estimated position of the previous positioning period and the target position, and calculates the current value of the motor controlled in the current speed control period through the error between the speed of the robot in the previous speed control period and the target speed, which reduces power consumption while ensuring efficiency, can quickly and accurately reach the set inspection position, and can complete the inspection task more energy-saving and efficiently;

(4) the robot inspection control method in the present invention can better adapt to the data collection and inspection requirements of the livestock and poultry farms, and can process and feed back abnormal conditions; and (5) the mounting structure of the video data collection device in the present invention is arranged to be angle-adjustable, so that the needs of video data collection in different scenarios and at different angles can be better met, and the consistency of data collected by devices is ensured.

Figure 1:
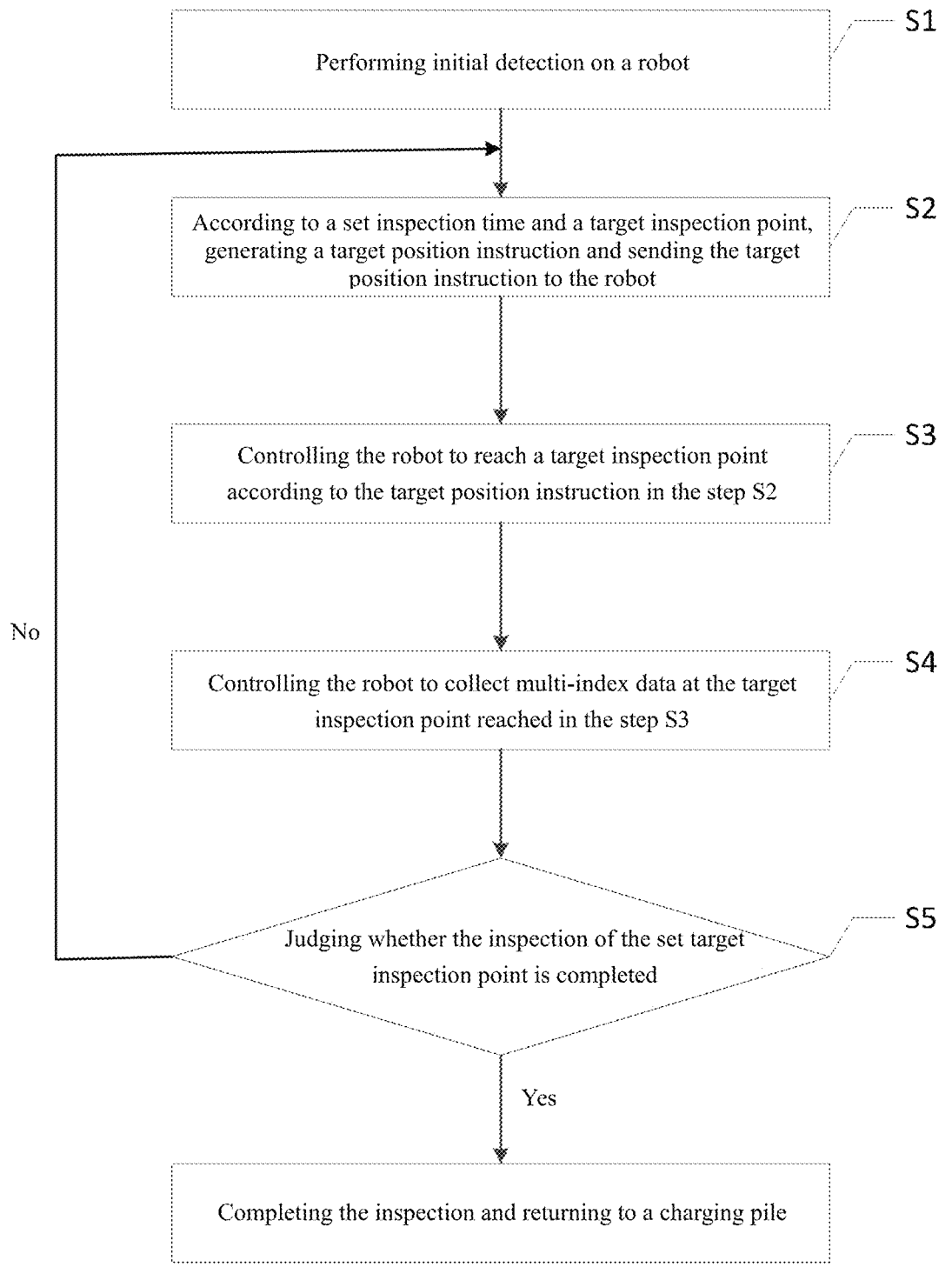
FIG. 1 is a flowchart of a control method for a livestock and poultry health inspection robot for multi-index collection.

Reference numerals are as follows: 1: driving wheel motor, 2: first laser ranging sensor, 3: video data collection module, 4: second laser ranging sensor, 5: I-shaped steel track, 6: first laser reflection baffle, 7: second laser reflection baffle, 8: environmental data collection module, 9: inspection control module, 10: sound collector, 11: temperature and humidity sensor, 12: carbon dioxide sensor, 13: depth camera, 14: color camera, and 15: infrared camera.

DETAILED DESCRIPTION OF EMBODIMENTS

The following description of the specific embodiments of the present invention is provided to facilitate the understanding of the present invention by those skilled in the art, however, it should be understood that the present invention is not limited to the scope of the specific embodiments, and for those of ordinary skill in the art, various changes that are made without departing from the spirit and scope of the present invention as defined and determined by the appended claims are apparent, and all inventions and creations that are made by using the concept of the present invention are within the protective scope.

As shown in FIG. 1, a control method for a livestock and poultry health inspection robot for multi-index collection comprises the following steps S1-S5.

S1: the robot is subjected to initial detection.

In an optional embodiment of the present invention, after the inspection control module starts to execute, the inspection control module monitors whether a battery level of the robot is sufficient, and if the battery level is insufficient, the inspection control module issues a charging instruction. Then, the inspection control module checks whether the laser data are abnormal, if the laser data are not abnormal, the robot is controlled to return to a charging pile for charging, and if the laser data are abnormal, the laser ranging sensor is proved to detect that foreign matters exist in the moving direction of the robot or the laser ranging sensor is damaged. In this case, the inspection control module gives an alarm and feeds back the alarm to a cloud server, and the robot is operated again after waiting for the overhaul of a manager.

The step S1 comprises the following substeps:

S11: judging whether a battery level of the robot is sufficient; if yes, proceeding to the step S2; otherwise, sending a charging command to the robot and proceeding to substep S12.

S12: judging whether laser data of the robot is abnormal; and if yes, performing alarming; otherwise, controlling the robot to return to a charging pile according to the charging instruction in the substep S11.

The judging whether laser data of the robot is abnormal comprises the following steps:

S121: judging whether an amplitude of two consecutive frames of laser data is greater than a set laser data amplitude threshold; if yes, judging that the data are abnormal; otherwise, proceeding to substep S122.

S122: judging whether the current frame of laser data are in a range between a set minimum laser data threshold and a set maximum laser data threshold; if yes, proceeding to substep S123; otherwise, judging that the data are abnormal.

S123: judging whether a difference between the current frame of laser data and an optimal estimated position value of a previous positioning period is greater than a set actual measurement error threshold; if yes, judging that the data are abnormal; otherwise, judging that the data are not abnormal.

S2: according to a set inspection time and a target inspection point, a target position instruction is generated, and the target position instruction is sent to the robot.

In an optional embodiment of the present invention, according to the set inspection time and the target inspection point, the inspection control module generates a target position instruction and sends the target position instruction to the driving wheel motor group.

S3: the robot is controlled to reach a target inspection point according to the target position instruction in the step S2.

In an optional embodiment of the present invention, the driving wheel motor group receives the target position instruction, and after the set inspection time is reached, the driving robot starts to perform the inspection task.

Figure 2:
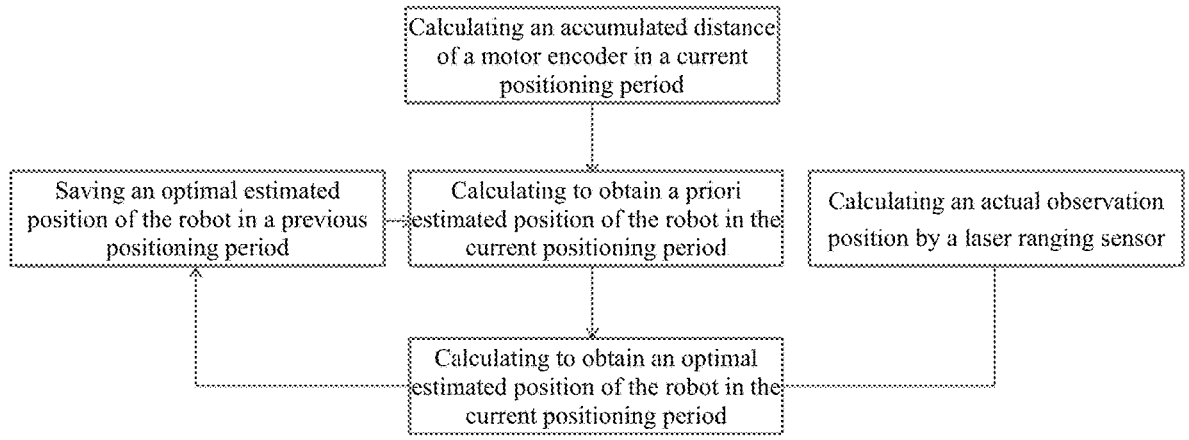
FIG. 2 is a flowchart of a multi-sensor fusion positioning submodule of a control method for a livestock and poultry health inspection robot for multi-index collection.

In the process of performing the inspection task by the robot, the present invention adopts a multi-sensor fusion positioning method based on an adaptive Kalman filtering algorithm, as shown in FIG. 2, provided is a flowchart of a multi-sensor fusion positioning submodule of a control method for a livestock and poultry health inspection robot for multi-index collection, the Kalman gain is adaptively adjusted by using an adaptive measurement noise variance function designed by the present invention, the position information of the robot in the previous positioning period, the reading of the encoder after applying a control quantity in the current positioning period and the reading of the laser ranging sensor are fused, and the optimal estimated position of the robot in the current positioning period is continuously updated.

Figure 3:
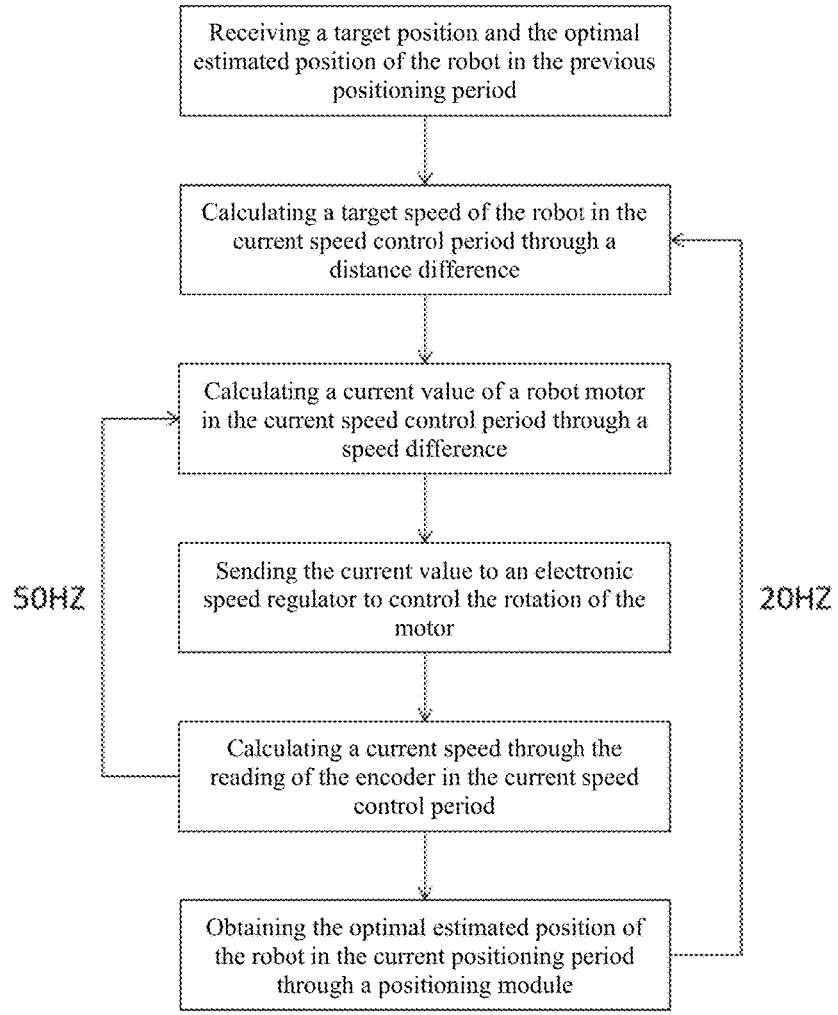
FIG. 3 is a flowchart of a speed adaptive control submodule of a control method for a livestock and poultry health inspection robot for multi-index collection.

Meanwhile, the present invention adopts a speed adaptive control method based on a feedback mechanism, as shown in FIG. 3, provided is a flowchart of a speed adaptive control submodule of a control method for a livestock and poultry health inspection robot for multi-index collection, the target speed of the robot in the current speed control period is calculated through the error between the optimal estimated position of the robot in the previous positioning period and the target position, the current value of the motor controlled in the current speed control period is calculated through the error between the speed of the robot in the previous speed control period and the target speed, and then the robot is driven to reach the target inspection point by using the obtained current value.

The step S3 comprises the following substeps:

S31: according to the optimal estimated position of the robot in the previous positioning period, the reading of an encoder and the reading of a laser ranging sensor, determining an optimal estimated position of the robot in a current positioning period.

The S31 comprises the following substeps:

S311: determining an accumulated distance of a motor encoder in the current positioning period according to the reading of the encoder.

S312: calculating a priori estimated position of the current positioning period according to the accumulated distance of the motor encoder in the current positioning period in the substep S311, wherein the calculation formula is as follows:

$$x_k^- = x_{k-1} + u_{k-1}$$

wherein $x_k^-$ is the priori estimated position of the current positioning period, $x_{k-1}$ is the optimal estimated position of the previous positioning period, and $u_{k-1}$ is the accumulated distance of the motor encoder in the current positioning period.

S313: calculating a priori estimated variance of the current positioning period according to a posteriori estimated variance and a process noise variance of the previous positioning period, wherein the calculation formula is as follows:

$$P_k^- = P_{k-1} + Q$$

wherein $P_k^-$ is the priori estimated variance of the current positioning period, $P_{k-1}$ is the posteriori estimated variance of the previous positioning period, $P_{k-1} = (1 - K_{k-1})P_{k-1}^-$ and $K_{k-1}$ are Kalman gain of the previous positioning period, $P_{k-1}^-$ is the priori estimated variance of the previous positioning period, and Q is the process noise variance.

S314: calculating a measurement noise variance according to an adaptive measurement noise variance function, wherein an analytic formula of the adaptive measurement noise variance function is as follows:

$$R = \frac{1}{\omega} \cdot \frac{Z_k}{\sqrt{1+Z_k^2}}$$

wherein R is the measurement noise variance, ω is an adaptive measurement noise variance coefficient, and ZK is an actual observation position of the current positioning period.

S315: according to the priori estimated variance of the current positioning period in the substep S313 and the measurement noise variance in the substep S314, calculating the Kalman gain of the current positioning period, wherein the calculation formula is as follows:

$$K_k = \frac{P_k^-}{P_k^- + R}$$

wherein $K_k$ is the Kalman gain of the current positioning period.

S316: according to the priori estimated position of the current positioning period in the substep S312, the Kalman gain of the current positioning period in the substep S315 and the actual observation position of the current positioning period, calculating an optimal estimated position of the current positioning period, wherein the calculation formula is as follows:

$$x_k = x_k^- + K_k(Z_k - x_k^-)$$

wherein $x_k$ is the optimal estimated position of the current positioning period.

S32: judging whether a difference between the optimal estimated position of the robot in the current positioning period in the substep S31 and a target position is less than a set target error threshold; if yes, reaching the target inspection point; otherwise, proceeding to substep S33.

S33: judging whether the laser data of the robot is abnormal; if yes, performing alarming; otherwise, proceeding to substep S34.

S34: according to the target position and the optimal estimated position of the previous positioning period, determining a current value of a motor controlled in the current speed control period.

The step S34 comprises the following substeps:

S341: according to the target position and the optimal estimated position of the previous positioning period, calculating a target speed of the robot in the current speed control period, wherein the calculation formula is as follows:

$$v_{target} = P_x(x_{target} - x_k)$$

wherein $v_{target}$ is the target speed of the robot in the current speed control period, $P_x$ is a position proportional coefficient, $x_{target}$ is the target position, and $x_{k-1}$ is the optimal estimated position of the previous positioning period.

S342: according to a feedback speed of a previous speed control period and the target speed of the robot in the current speed control period in the substep S341, calculating a current value of the motor controlled in the current speed control period, wherein the calculation formula is as follows:

$$cur_{target} = P_v e_k + I_v \sum_{i=0}^{k} e_i$$

wherein $cur_{target}$ is the current value of the motor controlled in the current speed control period, $P_v$ is a speed proportional coefficient, $e_k = v_{target} - v_{k-1}$ and $v_{k-1}$ are the feedback speed of the previous speed control period, and $I_v$ is an integral coefficient.

S35: controlling the robot to move according to the current value of the motor in the current speed control period in the substep S34, updating the reading of the encoder and the reading of the laser ranging sensor, and jumping to the substep S31.

S4: the robot is controlled to collect multi-index data at the target inspection point reached in the step S3.

In an optional embodiment of the present invention, after the robot is judged to reach the target inspection point, the inspection control module generates a collection instruction and sends the collection instruction to a video data collection module comprising a depth camera, a color camera and an infrared camera, and an environmental data collection module comprising a temperature and humidity sensor, a carbon dioxide sensor and a sound collector. The video data collection module and the environmental data collection module receive the collection instruction of the inspection control module to start to collected video data and environmental data and transmit the collected video data and environmental data to the inspection control module.

Figure 4:
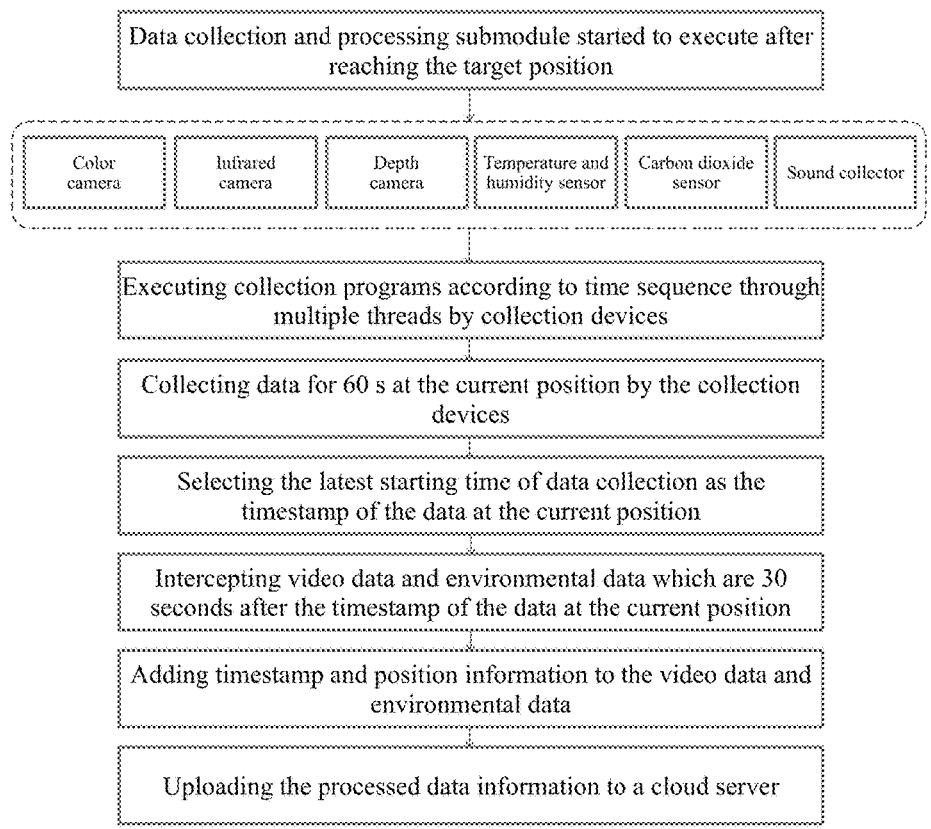
FIG. 4 is a flowchart of a data collection processing submodule of a control method for a livestock and poultry health inspection robot for multi-index collection.

As shown in FIG. 4, provided is a flowchart of a data collection processing submodule of a control method for a livestock and poultry health inspection robot for multi-index collection. When the robot reaches the set inspection position, the inspection control module controls the data collection and processing submodule through the collection instruction, namely controls the color camera, the infrared camera, the depth camera, the temperature and humidity sensor, the carbon dioxide sensor and the sound collector to execute the data collection instruction according to the time sequence through multiple threads.

Specifically, when the duration for collecting data by all the collection devices at the current collection position reaches 60 seconds, and the data time length covers a duration of 30 seconds, the latest starting time of data collection is selected as the timestamp of the data at the current position, the video data and the environmental data which are 30 seconds after the timestamp of the data at the current position are intercepted, the timestamp and the position information are added to each segment of video data and environmental data, the temporal consistency of multiple pieces of data collected by a plurality of devices is ensured, and then the processed video data and environmental data are uploaded.

The step S4 comprises the following substeps:
S41: obtaining multi-index data comprising depth video data, color video data, infrared video data, temperature and humidity data, carbon dioxide concentration data and sound data according to time sequence through multiple threads.
S42: selecting the latest starting time of the multi-index data in the substep S41 as timestamp of current position data.
S43: intercepting multi-index data of the current position data after the timestamp in the substep S42.
S44: adding the position information and the timestamp in the substep S42 to the multi-index data in the substep S43, and uploading the multi-index data with the position information and the timestamp.
S5: judging whether the inspection of the set target inspection point is completed; if yes, returning to a charging pile; otherwise, jumping to the step S2.

Figure 5:
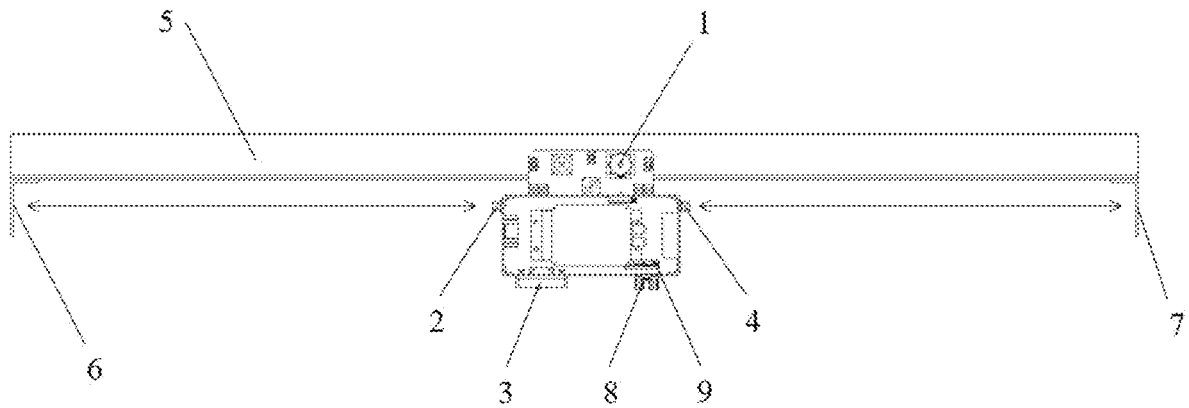
FIG. 5 is a diagram of control equipment for a livestock and poultry health inspection robot for multi-index collection applied to the method.

As shown in FIG. 5, the control equipment for a livestock and poultry health inspection robot for multi-index collection applied to the method comprises a driving wheel motor group, a laser ranging group, a video data collection module, an environmental data collection module and an inspection control module.

Specifically, the driving wheel motor group comprises a driving wheel motor 1 and an I-shaped steel track 5, and the driving wheel motor 1 is configured to receive a target position instruction of an inspection control module and drive the robot to move on the I-shaped steel track 5 to reach a target position.

In an optional embodiment of the present invention, when the set inspection time is reached, the inspection control module generates a target position instruction and sends the target position instruction to the driving wheel motor group. After receiving the target position instruction, the driving wheel motor group drives the robot to move on the I-shaped steel track and finally sends the robot to the target position. After all the target positions are inspected, the driving wheel motor group drives the robot to return to the charging pile for charging.

The laser ranging group comprises a first laser ranging sensor 2, a second laser ranging sensor 4, a first laser reflection baffle 6 and a second laser reflection baffle 7, the first laser ranging sensor 2 and the second laser ranging sensor 4 are configured for measurement to obtain observation position information of the robot in the current positioning period and transmitting the observation position information to an inspection control module, and the first laser reflection baffle 6 and the second laser reflection baffle 7 are configured to reflect laser beams emitted by the laser ranging sensors.

In an optional embodiment of the present invention, the laser ranging group can measure the actual observation position of the current positioning period in real time through the two laser ranging sensors and the two laser reflection baffles, and transmit the actual observation position information to the inspection control module, and the inspection control module can further calculate the optimal estimated position of the robot according to the actual observation position information, so that the accurate positioning of the robot is achieved.

The video data collection module 3 comprises a depth camera, a color camera and an infrared camera, the depth camera is configured to receive a collection instruction of an inspection control module to collect depth video data and transmit the depth video data to the inspection control module, the color camera is configured to receive a collection instruction of an inspection control module to collect color video data and transmit the color video data to the inspection control module, and the infrared camera is configured to receive a collection instruction of an inspection control module to collect infrared video data and transmit the infrared video data to the inspection control module.

Figure 6:
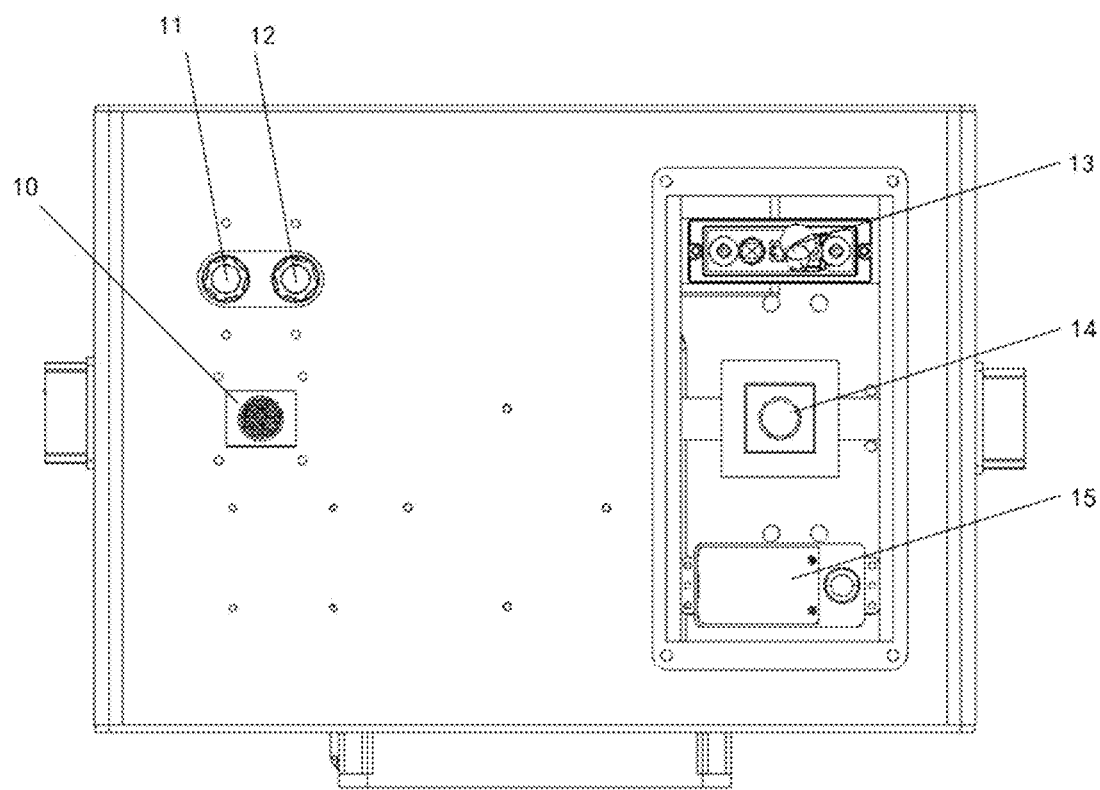
FIG. 6 is a schematic diagram of a mounting structure of a data collection device of control equipment for a livestock and poultry health inspection robot for multi-index collection applied to the method.

As shown in FIG. 6, provided is a schematic diagram of a mounting structure of a data collection device of control equipment for a livestock and poultry health inspection robot for multi-index collection applied to the method. The color camera 14 is mounted in the middle of the video data collection module at the bottom of the robot, and can rotate around the mounting shaft within a range of −45° to 45°. The infrared camera 15 is mounted on one side of the video data collection module at the bottom of the robot, and can rotate around the mounting shaft within a range of −30° to 30°. The depth camera 13 is mounted on one side of the video data collection module at the bottom of the robot, and can rotate around the mounting shaft within a range of −30° to 30°.

In an optional embodiment of the present invention, after the robot reaches the set inspection position, the inspection control module controls the video data collection module through the collection instruction, namely controls the color camera, the infrared camera and the depth camera to execute the data collection instruction according to the time sequence through multiple threads.

Specifically, when the duration for collecting data by the color camera, the infrared camera and the depth camera at the current collection position reaches 60 seconds, and the data time length covers a duration of 30 seconds, the latest starting time of data collection is selected as the timestamp of the video data at the current position, the video data that is 30 seconds after the timestamp of the data at the current position is intercepted, the timestamp and the position information are added to each segment of video data, the temporal consistency of multiple pieces of data collected by a plurality of devices is ensured, and then the processed video data and environmental data are uploaded.

The environmental data collection module 8 comprises a temperature and humidity sensor, a carbon dioxide sensor and a sound collector, the temperature and humidity sensor is configured to receive a collection instruction of an inspection control module to collect temperature and humidity data of an environment and transmit the temperature and humidity data to the inspection control module, the carbon dioxide sensor is configured to receive a collection instruction of an inspection control module to collect carbon dioxide concentration data in the environment and transmit the carbon dioxide concentration data to the inspection control module, and the sound collector is configured to receive a collection instruction of an inspection control module to collect sound data in the environment and transmit the sound data to the inspection control module.

As shown in FIG. 6, provided is a schematic diagram of a mounting structure of a data collection device of control equipment for a livestock and poultry health inspection robot for multi-index collection applied to the method. The temperature and humidity sensor 11 is mounted at the bottom of the robot, and an extended probe can collect the temperature and humidity data of the environment. The carbon dioxide sensor 12 is mounted at the bottom of the robot, and an extended probe can collect carbon dioxide concentration data in the environment. The sound collector 10 is mounted at the bottom of the robot, and an extended microphone can collect sound data in the environment.

In an optional embodiment of the present invention, after the robot reaches the set inspection position, the inspection control module controls the environmental data collection module through the collection instruction, namely controls the temperature and humidity sensor, the carbon dioxide sensor and the sound collector to execute the collection instruction according to the time sequence through multiple threads.

Specifically, when the duration for collecting data by the temperature and humidity sensor, the carbon dioxide sensor and the sound collector at the current collection position reaches 60 seconds, and the data time length covers a duration of 30 seconds, the latest starting time of data collection is selected as the timestamp of the environmental data at the current position, the environmental data that is 30 seconds after the timestamp of the data at the current position is intercepted, the timestamp and the position information are added to each segment of environmental data, the temporal consistency of multiple pieces of data collected by a plurality of devices is ensured, and then the processed environmental data is uploaded.

The inspection control module 9 is configured to perform initial detection on the robot, generate a target position instruction according to a set inspection time and a target inspection point, send the target position instruction to the driving wheel motor group to control the robot to reach a target position, receive the observation position information of the robot in the current positioning period transmitted by the laser ranging group, check whether the laser data are abnormal, generate a collection instruction, send the collection instruction to the video collection module, receive video data of multi-index data transmitted by the video data collection module, generate a collection instruction, send the collection instruction to the environment collection module, and receive environmental data of multi-index data transmitted by the environmental data collection module.

It will be appreciated by those of ordinary skill in the art that the embodiments described herein are intended to help readers understand the principles of the present invention, and it should be understood that the protection scope of the present invention is not limited to such specific descriptions and embodiments. Those of ordinary skill in the art may make various other specific modifications and combinations based on the technical inspirations disclosed in the present invention without departing from the essence of the present invention, and these modifications and combinations are still within the protection scope of the present invention.

What is claimed is:

1. A control method for a livestock and poultry health inspection robot for multi-index collection, comprising the following steps:
   S1: performing initial detection on the robot;
   S2: according to a set inspection time and a target inspection point, generating a target position instruction and sending the target position instruction to the robot;
   S3: according to the target position instruction in the step S2, updating an optimal estimated position of the robot in a current positioning period by adopting a multi-sensor fusion positioning method based on an adaptive Kalman filtering algorithm, and controlling the robot to reach a target inspection point; wherein the step S3 comprises the following substeps:
      S31: according to the optimal estimated position of the robot in the previous positioning period, the reading of an encoder and the reading of a laser ranging sensor, determining the optimal estimated position of the robot in the current positioning period;
      S32: judging whether a difference between the optimal estimated position of the robot in the current positioning period in the substep S31 and a target position is less than a set target error threshold; if yes, determining the robot has reached the target inspection point; otherwise, proceeding to substep S33;
      S33: judging whether the laser data of the robot is abnormal; if yes, performing alarming; otherwise, proceeding to substep S34;
      S34: according to the target position and the optimal estimated position of the previous positioning period, determining a current value of a motor controlled in the current speed control period;
      S35: controlling the robot to move according to the current value of the motor in the current speed control period in the substep S34, updating the reading of the encoder and the reading of the laser ranging sensor, and jumping to the substep S31;
   S4: controlling the robot to collect multi-index data at the target inspection point reached in the step S3; and
   S5: judging whether the inspection of the set target inspection point is completed; if yes, returning to a charging pile; otherwise, jumping to the step S2.

2. The control method for a livestock and poultry health inspection robot for multi-index collection according to claim 1, wherein the step S1 comprises the following substeps:
   S11: judging whether a battery level of the robot is sufficient; if yes, proceeding to the step S2; otherwise, sending a charging command to the robot and proceeding to substep S12; and
   S12: judging whether laser data of the robot is abnormal; and if yes, performing alarming; otherwise, controlling the robot to return to a charging pile according to the charging instruction in the substep S11.

3. The control method for a livestock and poultry health inspection robot for multi-index collection according to claim 2, wherein in the substep S12, the judging whether laser data of the robot is abnormal comprises the following steps:

S121: judging whether an amplitude of two consecutive frames of laser data is greater than a set laser data amplitude threshold; if yes, judging that the data are abnormal; otherwise, proceeding to substep S122;

S122: judging whether the current frame of laser data are in a range between a set minimum laser data threshold and a set maximum laser data threshold; if yes, proceeding to substep S123; otherwise, judging that the data are abnormal; and S123: judging whether a difference between the current frame of laser data and an optimal estimated position value of a previous positioning period is greater than a set actual measurement error threshold; if yes, judging that the data are abnormal; otherwise, judging that the data are not abnormal.

4. The control method for a livestock and poultry health inspection robot for multi-index collection according to claim 1, wherein the S31 comprises the following substeps:

S311: determining an accumulated distance of a motor encoder in the current positioning period according to the reading of the encoder;

S312: calculating an a priori estimated position of the current positioning period according to the accumulated distance of the motor encoder in the current positioning period in the substep S311, wherein the calculation formula is as follows:

$$x_k^- = x_{k-1} + u_{k-1}$$

wherein $x_k^-$ is the a priori estimated position of the current positioning period, $x_{k-1}$ is the optimal estimated position of the previous positioning period, and $u_{k-1}$ is the accumulated distance of the motor encoder in the current positioning period;

S313: calculating an a priori estimated variance of the current positioning period according to an a posteriori estimated variance and a process noise variance of the previous positioning period, wherein the calculation formula is as follows:

$$P_k^- = P_{k-1} + Q$$

wherein $P_k^-$ is the a priori estimated variance of the current positioning period, $P_{k-1}$ is the a posteriori estimated variance of the previous positioning period, $P_{k-1}=(1-K_{k-1})P_{k-1}^-$, $K_{k-1}$ is Kalman gain of the previous positioning period, $P_{k-1}^-$ is the a priori estimated variance of the previous positioning period, and Q is the process noise variance;

S314: calculating a measurement noise variance according to an adaptive measurement noise variance function, wherein an analytic formula of the adaptive measurement noise variance function is as follows:

$$R = \frac{1}{\omega} \cdot \frac{Z_k}{\sqrt{1+Z_k^2}}$$

wherein R is the measurement noise variance, $\omega$ is an adaptive measurement noise variance coefficient, and $Z_k$ is an actual observation position of the current positioning period;

S315: according to the a priori estimated variance of the current positioning period in the substep S313 and the measurement noise variance in the substep S314, calculating the Kalman gain of the current positioning period, wherein the calculation formula is as follows:

$$K_k = \frac{P_k^-}{P_k^- + R}$$

wherein $K_k$ is the Kalman gain of the current positioning period; and

S316: according to the a priori estimated position of the current positioning period in the substep S312, the Kalman gain of the current positioning period in the substep S315 and the actual observation position of the current positioning period, calculating an optimal estimated position of the current positioning period, wherein the calculation formula is as follows:

$$x_k = x_k^- + K_k(Z_k - x_k^-)$$

wherein $x_k$ is the optimal estimated position of the current positioning period.

5. The control method for a livestock and poultry health inspection robot for multi-index collection according to claim 1, wherein the step S34 comprises the following substeps:

S341: according to the target position and the optimal estimated position of the previous positioning period, calculating a target speed of the robot in the current speed control period, wherein the calculation formula is as follows:

$$v_{target} = P_x(x_{target} - x_k)$$

wherein $v_{target}$ is the target speed of the robot in the current speed control period, P is a position proportional coefficient, $x_{target}$ is the target position, and $x_{k-1}$ is the optimal estimated position of the previous positioning period, k is the current period; and S342: according to a feedback speed of a previous speed control period and the target speed of the robot in the current speed control period in the substep S341, calculating a current value of the motor controlled in the current speed control period, wherein the calculation formula is as follows:

$$cur_{target} = P_v e_k + I_v \sum_{i=0}^{k} e_i$$

wherein $cur_{target}$ is the current value of the motor controlled in the current speed control period, $P_v$ is a speed proportional coefficient, $e_k$ is a target speed difference value of the robot in the current speed control period, $e_k = v_{target} - v_{k-1}$, $v_{k-1}$ is the feedback speed of the previous speed control period, $I_v$ is an integral coefficient, and $e_i$ is a target speed different value of the robot in the speed control period, i=0, 1, 2 . . . k.

6. The control method for a livestock and poultry health inspection robot for multi-index collection according to claim 1, wherein the step S4 comprises the following substeps:

S41: obtaining multi-index data comprising depth video data, color video data, infrared video data, temperature and humidity data, carbon dioxide concentration data and sound data according to time sequence through multiple threads;

S42: selecting the latest starting time of the multi-index data in the substep S41 as timestamp of current position data;

S43: intercepting multi-index data of the current position data after the timestamp in the substep S42; and S44: adding the position information and the timestamp in the substep S42 to the multi-index data in the substep S43, and uploading the multi-index data with the position information and the timestamp.

7. A control equipment for a livestock and poultry health inspection robot for multi-index collection applied to the method according to claim 1, comprising:

a driving wheel motor group, wherein the driving wheel motor group comprises a driving wheel motor and an I-shaped steel track, and the driving wheel motor is configured to receive a target position instruction of an inspection control module and drive the robot to move on the I-shaped steel track to reach a target position;

a laser ranging group, wherein the laser ranging group comprises two laser ranging sensors and two laser reflection baffles, the laser ranging sensors are configured for measurement to obtain observation position information of the robot in the current positioning period and transmitting the observation position information to an inspection control module, and the laser reflection baffles are configured to reflect laser beams emitted by the laser ranging sensors;

a video data collection module, wherein the video data collection module comprises a depth camera, a color camera and an infrared camera, the depth camera is configured to receive a collection instruction of an inspection control module to collect depth video data and transmit the depth video data to the inspection control module, the color camera is configured to receive a collection instruction of an inspection control module to collect color video data and transmit the color video data to the inspection control module, and the infrared camera is configured to receive a collection instruction of an inspection control module to collect infrared video data and transmit the infrared video data to the inspection control module;

an environmental data collection module, wherein the environmental data collection module comprises a temperature and humidity sensor, a carbon dioxide sensor and a sound collector, the temperature and humidity sensor is configured to receive a collection instruction of an inspection control module to collect temperature and humidity data of an environment and transmit the temperature and humidity data to the inspection control module, the carbon dioxide sensor is configured to receive a collection instruction of an inspection control module to collect carbon dioxide concentration data in the environment and transmit the carbon dioxide concentration data to the inspection control module, and the sound collector is configured to receive a collection instruction of an inspection control module to collect sound data in the environment and transmit the sound data to the inspection control module; and an inspection control module, wherein the inspection control module is configured to perform initial detection on the robot, generate a target position instruction according to a set inspection time and a target inspection point, send the target position instruction to the driving wheel motor group to control the robot to reach a target position, receive the observation position information of the robot in the current positioning period transmitted by the laser ranging group, check whether the laser data are abnormal, generate a collection instruction, send the collection instruction to the video collection module, receive video data of multi-index data transmitted by the video data collection module, generate a collection instruction, send the collection instruction to the environment collection module, and receive environmental data of multi-index data transmitted by the environmental data collection module.

* * * * *